United States Patent [19]

Grantham et al.

[11] Patent Number: 4,477,373

[45] Date of Patent: Oct. 16, 1984

[54] MOLTEN SALT HAZARDOUS WASTE DISPOSAL PROCESS UTILIZING GAS/LIQUID CONTACT FOR SALT RECOVERY

[75] Inventors: LeRoy F. Grantham, Calabasas; Donald E. McKenzie, Woodland Hills, both of Calif.

[73] Assignee: Rockwell International Corporation, El Segundo, Calif.

[21] Appl. No.: 385,155

[22] Filed: Jun. 4, 1982

[51] Int. Cl.³ .................... C09K 3/00; C09K 11/04
[52] U.S. Cl. ........................ 252/626; 110/215; 110/216; 110/235; 110/237; 110/344; 110/345; 252/632; 423/184; 423/210.5
[58] Field of Search ............... 110/215, 216, 237, 344, 110/345; 252/626, 630, 631, 632; 423/184, 210.5

[56] References Cited

U.S. PATENT DOCUMENTS

| | | | |
|---|---|---|---|
| 3,567,412 | 3/1971 | Lefrancois et al. | 48/202 |
| 3,642,583 | 2/1972 | Greenberg et al. | 203/11 |
| 3,708,270 | 1/1973 | Birk et al. | 48/202 |
| 3,845,190 | 10/1974 | Yosim et al. | 423/184 |
| 4,065,400 | 12/1977 | Bjorklund | 252/626 |
| 4,145,396 | 3/1979 | Grantham | 423/22 |
| 4,246,255 | 1/1981 | Grantham | 423/659 |
| 4,276,834 | 7/1981 | Bregulla et al. | 252/626 X |
| 4,309,393 | 1/1982 | Nguyen | 110/345 X |
| 4,320,709 | 3/1982 | Hladum | 110/210 X |

*Primary Examiner*—Leland A. Sebastian
*Attorney, Agent, or Firm*—Henry Kolin; Michael A. Kondzella; H. Fredrick Hamann

[57] ABSTRACT

The products of a molten salt combustion of hazardous wastes are converted into a cooled gas, which can be filtered to remove hazardous particulate material, and a dry flowable mixture of salts, which can be recycled for use in the molten salt combustion, by means of gas/liquid contact between the gaseous products of combustion of the hazardous waste and a solution produced by quenching the spent melt from such molten salt combustion.

The process results in maximizing the proportion of useful materials recovered from the molten salt combustion and minimizing the volume of material which must be discarded. In a preferred embodiment a spray dryer treatment is used to achieve the desired gas/liquid contact.

6 Claims, 1 Drawing Figure

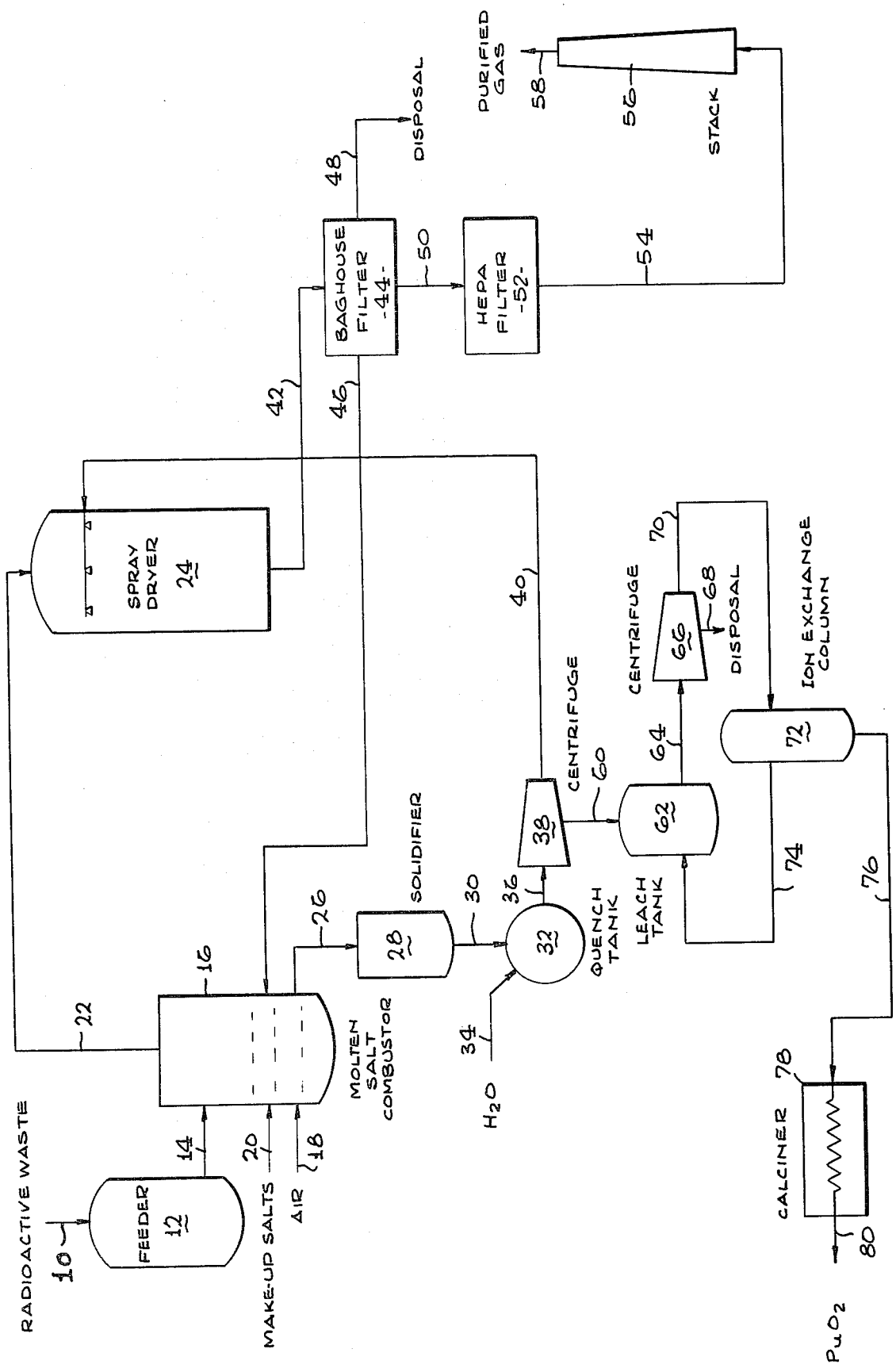

MOLTEN SALT HAZARDOUS WASTE DISPOSAL PROCESS UTILIZING GAS/LIQUID CONTACT FOR SALT RECOVERY

BACKGROUND OF THE INVENTION

1. Field of the Invention

This invention relates to the disposal of hazardous materials and especially to a process for the recovery of salts from melts which are used in the destruction of hazardous materials. In one of its more particular aspects, this invention relates to a process for recovering such salts in dry, particulate form. In another of its more particular aspects this invention relates to a process for concentrating and recovering values such as plutonium values from wastes containing the same.

2. Prior Art

Many different ways of disposing of hazardous materials have been proposed. One example of a method for disposing of hazardous wastes, such as pesticides, explosives, radioactive wastes and the like, is the use of molten salts to combust wastes containing such hazardous materials.

U.S. Pat. No. 3,642,583, for example, discloses a process for sewage treatment which uses a molten chloride, bromide, nitrate, oxide, hydroxide or sulfate or a mixture thereof to evaporate and combust aqueous materials.

U.S. Pat. No. 3,708,270 discloses a process for combusting organic materials by use of a carbonate-based molten salt.

U.S. Pat. No. 3,845,190 discloses a process for disposing of organic pesticides by means of oxidation in a molten salt. In this process the gaseous products are removed and the non-volatile products remain in the melt.

U.S. Pat. No. 4,145,396 discloses a process for removing volatile radioactive materials such as strontium, cesium, iodine and ruthenium from organic wastes by means of a molten salt bath.

U.S. Pat. No. 4,246,255 discloses a process for the disposal of polychlorinated biphenyls (PCB's) using a molten salt.

While the processes disclosed in the prior art provide certain useful techniques for disposing of hazardous wastes and for recovering valuable materials from waste products, none of the prior art processes provides a means for disposing of hazardous wastes in a manner such that the volume of the wastes is reduced to a practical level without disposing of potentially valuable materials along with the hazardous materials.

OBJECTS OF THE INVENTION

It is accordingly an object of this invention to provide a process for reducing the volume of hazardous wastes to a practical level while recovering useful materials present in the hazardous wastes or used in the destruction thereof.

It is another object of this invention to provide such a process wherein spent molten salts are removed from a molten salt reaction zone and recovered in the form of dry, particulate solids.

It is another object of this invention to provide such a process wherein contact between an aqueous solution of a spent molten salt and the hot off-gas from a molten salt reaction zone results in the production of a dry, flowable mixture of salts which can be recycled to the molten salt reaction zone, and a cooled gas, which can be filtered to remove hazardous particulate matter therefrom.

It is another object of this invention to provide such a process which is particularly adaptable to the treatment of radioactive wastes such as wastes containing plutonium or other actinide values.

Still another object of this invention is to provide a process wherein the volume of hazardous waste materials is reduced to a minimum.

Other objects and advantages of this invention will become apparent in the course of the following detailed description thereof.

SUMMARY OF THE INVENTION

In accordance with the broad aspects of the present invention, the spent melt from a hazardous waste combustion utilizing a molten salt as the combustion medium is quenched to form an aqueous solution containing the salts comprising the molten salt and brought into direct contact with the hot off-gas from the combustion, whereby the gas is cooled to enable filtering of particulates of hazardous material therefrom and the solution is dehydrated to produce a dry, particulate solid product. In a preferred embodiment of this invention the aqueous solution containing the spent melt is introduced into a spray dryer where it contacts the hot off-gas from the combustion of the hazardous waste and is converted into a dry, flowable solid.

The invention will be more clearly understood by reference to the detailed description of certain preferred embodiments which follows taken in connection with the accompanying direction.

BRIEF DESCRIPTION OF THE DRAWING

The sole FIGURE of the drawing is a schematic flow diagram illustrating a preferred embodiment of the process of the invention in which radioactive waste is combusted in a molten salt bath and the spent melt is quenched and dried in a spray dryer to produce a dry, flowable solid which is recycled to the molen salt bath.

DESCRIPTION OF THE PREFERRED EMBODIMENTS

The present invention provides a process for recovering the salts comprising a molten salt reaction medium which have been spent in the course of the molten salt destruction of hazardous wastes. The process avoids the necessity of disposing of these salts by providing a means for recycling the salts to the molten salt reaction medium. It also provides a means for facilitating the separation of hazardous materials from the gases produced in the destruction of hazardous wastes.

The process of this invention is useful where it is necessary to separate a hazardous material from a molten salt reaction medium and where it is desirable to recover as much of the salts comprising the molten salt reaction medium as possible. By using this process, the quantity of useful material which must be discarded along with the hazardous material is minimized. This invention is particularly important in those instances where the only practical means of disposal of hazardous materials is storage or burial, in that this invention provides a means for minimizing the quantity of material which must be carbonates may be utilized. For example, the ternary alkali metal carbonate eutectic consisting of 43.5, 31.5 and 25.0 mole % of the carbonates of lithium, sodium and potassium, respectively, melts at about 397°

C. A preferred binary mixture is a sodium carbonate-potassium carbonate eutectic, which melts at about 710° C. When the principal consideration is the cost of the molten salt, a particularly preferred salt mixture comprises sodium carbonate and optionally contains about 1-25 wt. % sodium sulfate, which may be used at a temperature of about 750°-1000° C.

The exact pressures and temperatures utilized are not critical, provided that they are so selected as to be above the melting point of the salt or salt mixture and below its decomposition temperature. Generally, the temperature will be within the range of about 700°-1000° C. and the pressure will be within the range of about 0.5-10 atmospheres. A temperature of about 800°-900° C. and a pressure of about 0.8-1.0 atmosphere are generally preferred, particularly where sodium carbonate is used as the molten salt.

Typical hazardous waste materials contain a substantial quantity of organic constituents and have a sufficiently high heating value to maintain the molten salt at the desired temperature when burned. However, where the heating value of the hazardous waste material is insufficient to maintain the desired temperature, any carbonaceous material such as coal, tar, petroleum residuals and the like may be added to the feed to increase its heating value.

The hazardous waste and a source of oxygen are introduced into a molten salt, conveniently a molten salt bath. Generally, in the interest of economy, the source of oxygen used will be air. Therefore, the off-gases will include nitrogen and may also include unreacted oxygen. However, when it is desired to reduce the volume of gaseous products, pure oxygen can be used. Alternatively, oxygen-enriched air can be utilized.

Under the conditions prevailing in the molten salt the volume of waste will be substantially reduced and stored or buried.

Another advantage of this invention resides in the ease of separation of hazardous materials from the hot off-gases produced in the molten salt reaction medium, which off-gases can be purified after treatment in accordance with the process of this invention to a sufficiently great extent to permit release thereof to the atmosphere without danger of contamination. Thus, the process of the present invention is of significant importance as an adjunct to any waste disposal process in which gaseous products are formed.

In practicing the process of the present invention a hazardous waste and a source of gaseous oxygen such as air, oxygen or enriched air, are introduced into a molten salt comprising an alkali metal carbonate. The molten salt is maintained at a temperature in the range of about 400°-1000° C. and a pressure within the range of about 0.5-10 atmospheres to oxidize the organic constituents of the hazardous waste. Complete combustion is generally preferred. Under such conditions, the volume of the hazardous waste is substantially reduced and solid and gaseous combustion products are formed. The gaseous combustion products consist essentially of carbon dioxide and water vapor if the combustion is complete. The solid products comprise the inorganic ash constituents of the waste. In the case of wastes which contain metallic compounds the metals are retained in the molten salt.

The molten salt may be formed from either a single alkali metal carbonate or bicarbonate or a mixture of two or more alkali metal carbonates or bicarbonates and may include about 1 wt. % to about 25 wt. % of an alkali metal sulfate. The advantage of the inclusion of the sulfate is that it enhances the combustion rate of the organic material, as described in U.S. Pat. No. 3,567,412. Alkali metal carbonates are preferred, especially lithium carbonate, sodium carbonate and potassium carbonate.

Where it is desired to perform the combustion of the hazardous waste at a relatively low temperature, a low melting binary or ternary mixture of alkali metal combustion products will be formed, which include a gaseous effluent consisting essentially of hot carbon dioxide and water vapor off-gases. This gaseous effluent can be vented to the atmosphere, preferably after being cooled and passed through a series of filters to remove any trace amounts of hazardous materials which may be entrained therein as well as any particulate alkali metal salts entrained in the off-gases. The remaining combustion products are retained in the spent melt.

At least a portion of the spent melt containing the combustion products is withdrawn and mixed with an aqueous quenching medium such as water or an aqueous salt solution. The quenched melt then is treated, such as by filtration or centrifugation, to remove insoluble combustion products, thereby forming a substantially solids-free solution. The insoluble combustion products removed contain any radioactive elements which may be present or, in the case of non-radioactive hazardous wastes, any hazardous materials which have not been decomposed in the molten salt bath. Alternatively, the quenched melt solution may be carbonated to reduce sodium solubility before or during recovery, if desired. The insoluble combustion products are then solubilized by leaching with an inorganic acid. The solubilized products, for example, salts of radioactive elements, then can be recovered by conventional means, such as solvent extraction or ion exchange resin separation techniques known in the art.

The solution from which the undecomposed hazardous wastes or the radioactive elements have been separated is then contacted with the hot effluent gases from the molten salt combustion in order to dehydrate and solidify the salts present therein. For this purpose any suitable gas-liquid contact apparatus may be utilized. A preferred apparatus for this purpose is a spray dryer, into which the solution containing the spent salts is sprayed in contact with the gaseous products of combustion. Contact of the sprayed solution with the hot gases results in the drying thereof in a manner such that particulate solids are formed to provide a dry free-flowing solid product which can be recycled to the molten salt reaction zone. In addition, the hot gaseous products are cooled to a temperature at which it is possible to filter any remaining particulate without injury to the filter used for this purpose. Cooling to any desired temperature is acceptable so long as the gases are not cooled to a temperature below the dew-point thereof. In general, the gases are cooled from temperatures in the range of about 700°-1000° C. to about 50°-250° C. Cooling to a temperature in the range of about 70°-120° C. is preferred.

Suitable filters include baghouse filters and HEPA filters which are effective to remove entrained solids after cooling as described above. Upon filtration, the purified off-gases can be vented to the atmosphere or otherwise treated as desired.

Reference will now be made to the drawing in order to set forth in greater detail the utilization of a molten salt bath in the disposal of a hazardous waste exemplified by a radioactive waste and the recycling of salts regenerated from spent melt and the purification of gaseous products in accordance with the process of the present invention. A radioactive waste is introduced via a conduit 10 to a feeder 12. Waste from feeder 12 is fed into a molten salt combustor 16 via a conduit 14. Air is introduced into combustor 16 via a conduit 18 and makeup salts are introduced via a conduit 20. Gases exit the molten salt combustor 16 via a conduit 22 and are introduced into a spray dryer 24. Spent melt is removed periodically from combustor 16 via a conduit 26 and introduced into a solidifier 28 from whence the solidified melt is fed via conduit 30 to a quench tank 32. Optionally, the spent melt may be introduced directly into the quench tank without previous solidification. Water or a suitable aqueous solution is introduced into quench tank 32 via a conduit 34. The quenched spent melt exits quench tank 32 via a conduit 36 and is conducted to a centrifuge 38 wherein the centrifugate containing an aqueous solution of the spent salts from molten salt combustor 16 is removed via a conduit 40 and introduced into spray dryer 24, wherein the solution is sprayed into contact with the hot off-gases from molten salt combustor 16. A mixture of the dry particulate solids and cooled gases exit spray dryer 24 via a conduit 42 and is introduced into a baghouse filter 44 wherein the solids are separated from the gas and recycled via a conduit 46 to molten salt combustor 16, with a bleed stream of solids being sent to disposal via a conduit 48. The gaseous product from baghouse filter 44 is conducted via a conduit 50 to a HEPA filter 52, wherein the remaining particulates are removed and the purified gaseous product is conducted via a conduit 54 to a stack 56 from which the purified gas exits to the atmosphere via a conduit 58. If desired, the cooled gases exiting the spray dryer may be cycloned prior to filtration to reduce particulate loading on the filter bags.

The solids removed in centrifuge 38 are introduced into leach tank 62 containing 1–6N mineral acid via a conduit 60 and the leached solids are removed as a slurry via conduit 64 to centrifuge 66 wherein the remaining solids are removed to disposal via a conduit 68. The centrifugate from centrifuge 66 is introduced via a conduit 70 into an ion exchange column 72 containing a cation exchange resin which retains the radioactive cations with the acid solution being removed via a conduit 74 and recycled into leach tank 62. Radioactive compounds are eluted periodically from ion exchange column 72 and removed via a conduit 76 to a calciner 78 wherein radioactive oxides, principally plutonium dioxide, $PuO_2$, are recovered via a conduit 80. Alternatively, the plutonium could be precipitated as an oxalate before calcination, if desired.

The invention will be better understood by reference to the following examples which illustrate embodiments of the process of this invention and should not be construed as limiting the scope thereof.

EXAMPLE 1

A slurry containing 96 lb. $NaHCO_3$, 4 lb. NaCl and 300 lb. $H_2O$ simulating a quenched, carbonated molten salt from the combustion of a hazardous waste in a molten salt combustor was introduced into a Bowen spray dryer through spray nozzles at a feed rate of 0.10 to 0.20 gallons per minute (gpm). An off-gas containing 1.6% $H_2$, 18% $CO_2$, 4% CO, 1.8% $O_2$, 76% and $N_2$ and 0.2% $CH_4$, simulating an off-gas from the combustion of a hazardous waste in a molten salt combustor was contacted with the sprayed slurry in the spray dryer resulting in the cooling of the off-gas and the production of a dry, flowable solid product. The temperatures of the hot off-gas at the inlet to the spray dryer and the temperatures of the cooled off-gas at the exit to the spray dryer as well as the slurry flow rates at various times are shown in Table 1.

TABLE 1

| OFF-GAS TEMPERATURES AND FLOW RATES | | |
|---|---|---|
| Time min. | Inlet Temperature °C. | Outlet Temperature °C. | Slurry Flow Rate gpm |
| 0 | 689 | 202 | 0.10 |
| 0.5 | 720 | 222 | 0.10 |
| 1.0 | 731 | 229 | 0.10 |
| 1.5 | 732 | 238 | 0.10 |
| 1.8 | 735 | 255 | 0.10 |
| 4.0 | 735 | 255 | 0.15 |
| 4.5 | 738 | 254 | 0.15 |
| 5.0 | 737 | 250 | 0.20 |
| 5.1 | 734 | 250 | 0.20 |
| 7.0 | 734 | 250 | 0.20 |
| 7.5 | 733 | 248 | 0.20 |
| 8.0 | 733 | 248 | 0.20 |
| 9.3 | 732 | 245 | 0.20 |
| 12.4 | 728 | 234 | 0.20 |

This example shows that the off-gas from a molten salt combustor can be cooled simultaneously with the production of a dry, flowable solid product in a spray dryer using the process of the present invention.

EXAMPLE 2

The following example is set forth to demonstrate the combustion of an actinide-containing organic waste to reduce its volume followed by the recovery of the actinide from the combustion products. Three combustion tests were conducted with plutonium-contaminated waste. The waste was a mixture of paper, paper products, plastic (a mixture of polyethylene and polyvinyl chloride), and rubber. The waste was contaminated with plutonium by adding a known volume of plutonium nitrate, sulfate, and chloride solutions to the waste. After contamination, the waste was mixed thoroughly. In two of the tests, the plutonium concentration in the waste was $9 \times 10^{-5}$ grams per gram of waste, and in one test the plutonium concentration was $1.1 \times 10^{-3}$ grams per gram, which corresponds roughly to the level of plutonium expected in low level and intermediate level actinide-containing wastes, respectively.

The waste was introduced into a molten sodium carbonate bath maintained at a temperature within the range from about 850°–905° C. The off-gas from each test was monitored and analyzed for plutonium content. By difference it was determined that about 99.9% of the plutonium was retained in the melt.

To demonstrate that the actinide (plutonium) could be recovered from the spent salt, solidified carbonate from the foregoing test was dissolved in water and filtered. The insoluble ash (containing the plutonium) was leached with various inorganic acids. The results are shown in Table 2.

TABLE 2

| RECOVERY OF PLUTONIUM FROM ASH-MELT MIXTURE | | | |
|---|---|---|---|
| Plutonium Leach Solution | | Plutonium Distribution* (%) | |
| Acid | Concentration | Leach Solution | Insoluble Residue+ |
| $HNO_3$–HF | 3N, 2N | 98.0 | 1.0 |
| HCl | 3N | 97.9 | 1.1 |

TABLE 2-continued

RECOVERY OF PLUTONIUM FROM ASH-MELT MIXTURE

| Plutonium Leach Solution | | Plutonium Distribution* (%) | |
|---|---|---|---|
| Acid | Concentration | Leach Solution | Insoluble Residue+ |
| HNO$_3$ | 2N | 90.7 | 8.3 |

*The aqueous sodium carbonate extraction always contained some plutonium. The minimum amount observed was 0.67%; the average of four tests was 0.97% of the plutonium.
+A second acid extraction dissolved about 60% of the plutonium remaining in the insoluble residue.

From the foregoing table it is seen that greater than 90% of the plutonium is recovered.

It can be seen that the present invention provides a process in which a hazardous waste is disposed of in a manner which maximizes the quantity of useful products which are recovered and minimizes the volume of hazardous material which must be stored or buried.

It will, of course, be realized that various modifications can be made to the design and operation of the process of this invention without departing from the spirit thereof. For example, other means can be used to separate the hazardous materials from the useful products recovered from the gas/liquid contacting zone and other forms of gas/liquid contacting apparatus than the spray dryer exemplified herein can be used if desired. Thus, while the principle, preferred design and mode of operation of the invention have been explained and what is now considered to represent its best embodiment has been illustrated and described, it should be understood that, within the scope of the appended claims, the invention can be practiced otherwise than as specifically illustrated and described.

What is claimed is:

1. A process for concentrating a plutonium-containing waste material which comprises:

combusting said plutonium-containing waste material in a molten salt comprising an alkali metal carbonate;

recovering from said combustion a gaseous product having a temperature in the range of about 700°–1000° C. and a melt containing spent alkali metal carbonate and plutonium oxide;

dissolving said melt to form a slurry containing a mixture of ash and plutonium oxide in an alkali metal carbonate solution;

separating said mixture of ash and plutonium oxide from said slurry;

recovering plutonium values from said mixture;

introducing the solution from which said mixture of ash and plutonium oxide have been separated into spray contact with said gaseous product in a spray drying zone;

separating from said spray drying zone a cooled gaseous product having a temperature in the range of about 50°–250° C., and a solid, flowable product containing alkali metal carbonate;

separating said solid, flowable product from said cooled gaseous product; and recycling said solid, flowable product to said molten salt.

2. A process according to claim 1 wherein said plutonium values are recovered by means of a process which comprises:

leaching said mixture of ash and plutonium oxide with a mineral acid;

separating the resulting soluble plutonium salt from said ash;

purifying said soluble plutonium salt by means of an ion exchange treatment; and calcining the purified soluble plutonium salt to recover dry plutonium dioxide product.

3. A process according to claim 1 wherein said plutonium values are recovered by means of a process which comprises:

leaching said mixture of ash and plutonium oxide with a mineral acid;

separating the resulting soluble plutonium salt from said ash;

purifying said soluble plutonium salt by means of an ion exchange treatment;

converting the purified soluble plutonium salt to an insoluble plutonium oxalate; and calcining said plutonium oxalate to recover dry plutonium dioxide product.

4. A process according to claim 1 wherein said solid, flowable product is separated from said cooled gaseous product by means of filtration.

5. A process for minimizing the volume of disposable waste resulting from the combustion of a hazardous waste in a molten salt comprising an alkali metal carbonate which comprises:

withdrawing at least a portion of a spent melt produced in the combustion of a hazardous waste in a molten salt;

mixing the withdrawn spent melt with an aqueous quenching medium to produce a slurry containing insoluble inorganic compounds of metals present in said hazardous waste in an aqueous solution comprising an alkali metal carbonate;

separating said insoluble inorganic compounds from said slurry;

spray drying the resulting alkali metal carbonate solution in a spray drying zone containing a hot gas produced in the combustion of said hazardous waste;

recovering from said spray drying zone a mixture of a cooled gas and a dry, flowable solid comprising an alkali metal carbonate;

separating said dry, flowable solid from said cooled gas; and recycling said dry, flowable solid to said molten salt.

6. A process for disposing of a hazardous waste which comprises:

introducing a hazardous waste and a source of gaseous oxygen into a molten salt comprising an alkali metal carbonate;

maintaining said molten salt at a temperature in the range of about 700°–1000° C. and a pressure within the range of about 0.5 to 10 atmospheres to thereby produce a hot gaseous product comprising carbon dioxide and water vapor and a spent melt containing metallic compounds and inorganic ash;

withdrawing at least a portion of said spent melt;

quenching the withdrawn spent melt with an aqueous solution to produce a slurry containing insoluble metallic compounds and inorganic ash in an aqueous solution comprising an alkali metal carbonate;

separating said insoluble metallic compounds and said inorganic ash from said slurry;

disposing of said insoluble metallic compounds and said inorganic ash;

contacting the resulting alkali metal carbonate solution in the form of a spray with said hot gaseous product to cool said hot gaseous product to a temperature in the range of about 50°–250° C. and to form from said alkali metal carbonate solution a dry, flowable solid;

filtering said dry, flowable solid from the cooled gaseous product; and recycling said dry flowable solid to said molten salt.

* * * * *